US012604282B2

(12) United States Patent
Ly et al.

(10) Patent No.: US 12,604,282 B2
(45) Date of Patent: *Apr. 14, 2026

(54) UPLINK SPATIAL FILTER AND POWER CONTROL FOR CHANNEL ESTIMATION ACROSS PHYSICAL UPLINK CONTROL CHANNELS

(71) Applicant: QUALCOMM Incorporated, San Diego, CA (US)

(72) Inventors: Hung Dinh Ly, San Diego, CA (US); Gokul Sridharan, Sunnyvale, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/896,771

(22) Filed: Sep. 25, 2024

(65) Prior Publication Data

US 2025/0016696 A1    Jan. 9, 2025

Related U.S. Application Data

(63) Continuation of application No. 17/450,453, filed on Oct. 8, 2021, now Pat. No. 12,256,344.

(Continued)

(51) Int. Cl.
*H04W 52/42*        (2009.01)
*H04L 5/00*        (2006.01)
(Continued)

(52) U.S. Cl.
CPC .......... *H04W 52/42* (2013.01); *H04L 5/0051* (2013.01); *H04W 52/146* (2013.01); *H04W 52/242* (2013.01); *H04W 52/36* (2013.01)

(58) Field of Classification Search
CPC . H04W 52/42; H04W 52/146; H04W 52/242; H04W 52/36; H04W 52/16;
(Continued)

(56) References Cited

U.S. PATENT DOCUMENTS

2017/0318574 A1    11/2017   Choi et al.
2018/0213484 A1*    7/2018   Oh ........................ H04W 52/42
(Continued)

FOREIGN PATENT DOCUMENTS

WO      WO-2020069381 A1 *   4/2020   ......... H04B 7/06964

OTHER PUBLICATIONS

U.S. Appl. No. 62/959,059, filed Jan. 9, 2020, 97 Pages.

*Primary Examiner* — Sun Jong Kim
(74) *Attorney, Agent, or Firm* — ArentFox Schiff, LLP

(57)        ABSTRACT

A method for uplink spatial filter and power control for channel estimation across physical uplink control channels is provided. The method includes user equipment (UE) receiving, from a base station (BS), an indication to transmit a set of physical uplink control channels (PUCCHs) having a demodulation reference signal (DMRS), receiving, from the BS, one or more indicators indicating respective power control parameters for the set of PUCCHs, and based on different power control parameters being applied to transmissions, transmitting, to the BS, a first PUCCH and a second PUCCH from the set of PUCCHs comprising corresponding DMRSs having phase discontinuity. The one or more indicators further indicates respective spatial relation parameters for the set of PUCCHs, and wherein the set of PUCCHs are transmitted with the phase discontinuity based on different spatial relation parameters being applied to the transmissions.

10 Claims, 11 Drawing Sheets

Related U.S. Application Data

(60) Provisional application No. 63/090,091, filed on Oct. 9, 2020.

(51) Int. Cl.
   *H04W 52/14*       (2009.01)
   *H04W 52/24*       (2009.01)
   *H04W 52/36*       (2009.01)

(58) Field of Classification Search
   CPC .............. H04W 52/247; H04W 52/248; H04L
        5/0051; H04L 25/0204; H04L 25/0224;
        H04L 25/067; H04L 5/001; H04L 5/0023;
                          H04L 5/0048
   See application file for complete search history.

(56)                   References Cited

U.S. PATENT DOCUMENTS

| | | |
|---|---|---|
| 2020/0119778 A1 | 4/2020 | Grant et al. |
| 2022/0116892 A1 | 4/2022 | Ly et al. |
| 2022/0159640 A1 | 5/2022 | Matsumura et al. |
| 2022/0210807 A1 | 6/2022 | Park et al. |
| 2022/0322246 A1 | 10/2022 | Cirik et al. |
| 2023/0216712 A1* | 7/2023 | Yao ..................... H04L 25/0228 |

* cited by examiner

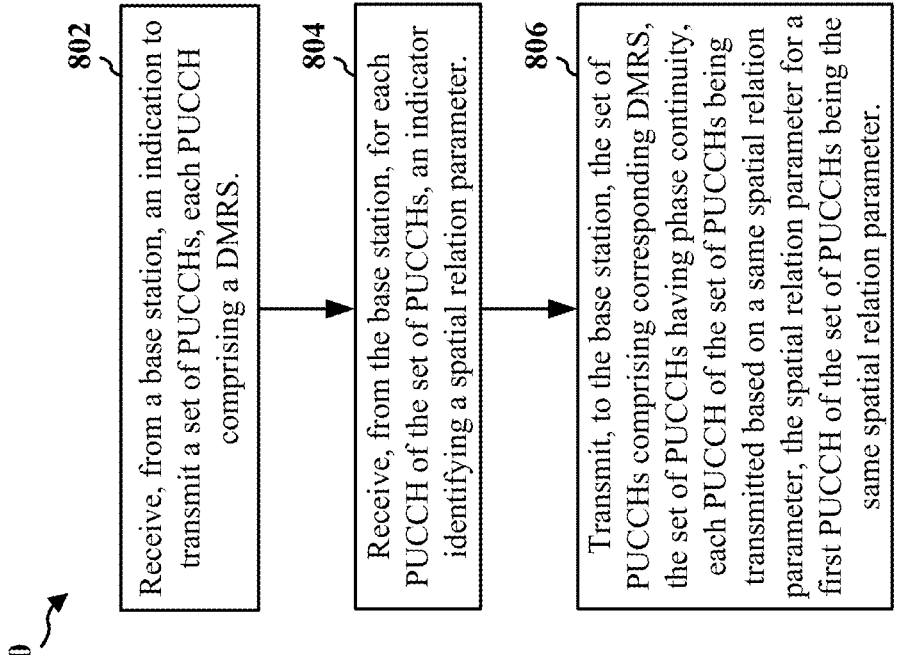

802

Receive, from a base station, an indication to transmit a set of PUCCHs, each PUCCH comprising a DMRS.

804

Receive, from the base station, for each PUCCH of the set of PUCCHs, an indicator identifying a spatial relation parameter.

806

Transmit, to the base station, the set of PUCCHs comprising corresponding DMRS, the set of PUCCHs having phase continuity, each PUCCH of the set of PUCCHs being transmitted based on a same spatial relation parameter, the spatial relation parameter for a first PUCCH of the set of PUCCHs being the same spatial relation parameter.

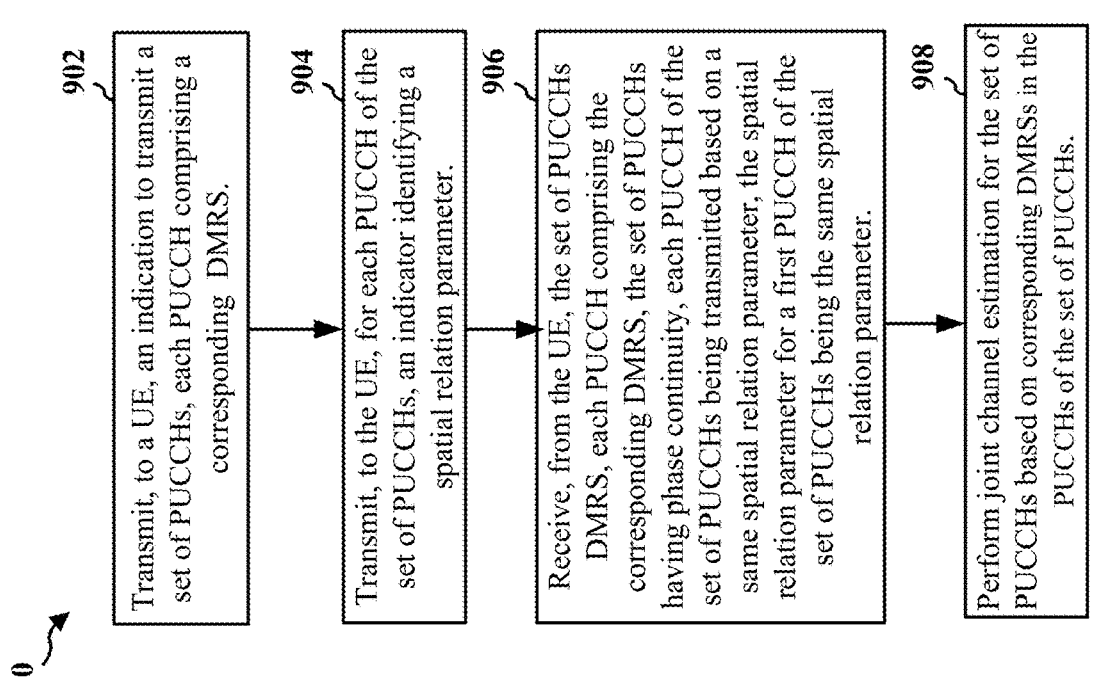

900

902

Transmit, to a UE, an indication to transmit a set of PUCCHs, each PUCCH comprising a corresponding DMRS.

904

Transmit, to the UE, for each PUCCH of the set of PUCCHs, an indicator identifying a spatial relation parameter.

906

Receive, from the UE, the set of PUCCHs DMRS, each PUCCH comprising the corresponding DMRS, the set of PUCCHs having phase continuity, each PUCCH of the set of PUCCHs being transmitted based on a same spatial relation parameter, the spatial relation parameter for a first PUCCH of the set of PUCCHs being the same spatial relation parameter.

908

Perform joint channel estimation for the set of PUCCHs based on corresponding DMRSs in the PUCCHs of the set of PUCCHs.

FIG. 9

UPLINK SPATIAL FILTER AND POWER CONTROL FOR CHANNEL ESTIMATION ACROSS PHYSICAL UPLINK CONTROL CHANNELS

CROSS REFERENCE TO RELATED APPLICATION(S)

This application is a continuation of U.S. application Ser. No. 17/450,453, entitled "UPLINK SPATIAL FILTER AND POWER CONTROL FOR PHYSICAL UPLINK CONTROL CHANNEL DEMODULATION REFERENCE SIGNAL BUNDLING," and filed on Oct. 8, 2021, which claims the benefit of U.S. Provisional Application Ser. No. 63/090, 091, entitled "UPLINK SPATIAL FILTER AND POWER CONTROL FOR PHYSICAL UPLINK CONTROL CHANNEL DEMODULATION REFERENCE SIGNAL BUNDLING" and filed on Oct. 9, 2020, which is expressly incorporated by reference herein in its entirety.

BACKGROUND

Technical Field

The present disclosure relates generally to communication systems, and more particularly, to a wireless communication system utilizing DMRSs for joint channel estimation.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The UE may receive, from a base station, an indication to transmit a set of physical uplink control channels (PUCCHs) with phase continuity across the set of PUCCHs; receive, from the base station, for each PUCCH of the set of PUCCHs, an indicator identifying a spatial relation parameter for the respective PUCCH; and transmit, to the base station, the set of PUCCHs with phase continuity across the set of PUCCHs, each PUCCH of the set of PUCCHs being transmitted based on a same spatial relation parameter, the spatial relation parameter for a first PUCCH of the set of PUCCHs being the same spatial relation parameter.

In some aspects, the spatial relation parameter for each respective PUCCH comprises a reference spatial domain filter.

In some aspects, the indicator for each PUCCH of the set of PUCCHs indicates the same spatial relation parameter, and wherein each PUCCH of the set of PUCCHs is transmitted based on its respective spatial relation parameter.

In some aspects, each indicator further identifies a power control parameter for the respective PUCCH, wherein each PUCCH of the set of PUCCHs is transmitted based on its respective power control parameter, and wherein each indicator identifies a same power control parameter.

In some aspects, the power control parameter for each respective PUCCH comprises an initial power value, a power ramping step size, or a reference signal to estimate a path loss.

In some aspects, the spatial relation parameter for a second PUCCH of the set of PUCCHs is different than the same spatial relation parameter, and wherein the second PUCCH is transmitted based on the same spatial relation parameter.

In some aspects, each indicator further identifies a power control parameter for the respective PUCCH, wherein the power control parameter for the second PUCCH of the set of PUCCHs is different than the power control parameter for the first PUCCH, and wherein the second PUCCH is transmitted based on the power control parameter of the first PUCCH.

In some aspects, the power control parameter for each respective PUCCH comprises an initial power value, a power ramping step size, or a reference signal to estimate a path loss.

In some aspects, the at least one processor receives the indication in a radio resource control message or in system information.

In some aspects, receiving, for each PUCCH of the set of PUCCHs, the indicator identifying the spatial relation parameter for the respective PUSCH includes receiving a single indicator identifying the spatial relation parameter for every PUCCH of the set of PUCCHs.

In some aspects, receiving, for each PUCCH of the set of PUCCHs, the indicator identifying the spatial relation parameter for the respective PUSCH includes receiving a separate indicator corresponding to each PUCCH.

In another aspect of the disclosure, a method, a computer-readable medium, and an apparatus are provided. The apparatus may be a base station. The base station may transmit, to a user equipment (UE), an indication to transmit a set of physical uplink control channels (PUCCHs) with phase continuity across the set of PUCCHs; transmit, to the UE, for each PUCCH of the set of PUCCHs, an indicator identifying a spatial relation parameter for the respective PUCCH; and receive, from the UE, the set of PUCCHs with phase continuity across the set of PUCCHs, each PUCCH of the set of PUCCHs being received based on a same spatial relation parameter, the spatial relation parameter for a first PUCCH of the set of PUCCHs being the same spatial relation parameter.

In some aspects, the base station may perform joint channel estimation for the set of PUCCHs based on the phase continuity across the set of PUCCHs.

In some aspects, the spatial relation parameter for each respective PUCCH comprises a reference spatial domain filter.

In some aspects, the indicator for each PUCCH of the set of PUCCHs indicates the same spatial relation parameter, and wherein each PUCCH of the set of PUCCHs is received based on its respective spatial relation parameter.

In some aspects, each indicator further identifies a power control parameter for the respective PUCCH, wherein each PUCCH of the set of PUCCHs is received based on its respective power control parameter, and wherein each indicator identifies a same power control parameter.

In some aspects, the power control parameter for each respective PUCCH comprises an initial power value, a power ramping step size, or a reference signal to estimate a path loss.

In some aspects, the spatial relation parameter for a second PUCCH of the set of PUCCHs is different than the same spatial relation parameter, and wherein the second PUCCH is received based on the same spatial relation parameter.

In some aspects, each indicator further identifies a power control parameter for the respective PUCCH, wherein the power control parameter for the second PUCCH of the set of PUCCHs is different than the power control parameter for the first PUCCH, and wherein the second PUCCH is received based on the power control parameter of the first PUCCH.

In some aspects, the power control parameter for each respective PUCCH comprises an initial power value, a power ramping step size, or a reference signal to estimate a path loss.

In some aspects, the at least one processor transmits the indication in a radio resource control message or in system information.

In some aspects, transmitting, for each PUCCH of the set of PUCCHs, the indicator identifying the spatial relation parameter for the respective PUSCH includes transmitting a single indicator identifying the spatial relation parameter for every PUCCH of the set of PUCCHs.

In some aspects, transmitting, for each PUCCH of the set of PUCCHs, the indicator identifying the spatial relation parameter for the respective PUSCH includes transmitting a separate indicator corresponding to each PUCCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a flowchart of a method of wireless communication.

FIG. 9 is a flowchart of a method of wireless communication.

DETAILED DESCRIPTION

Figure 1:
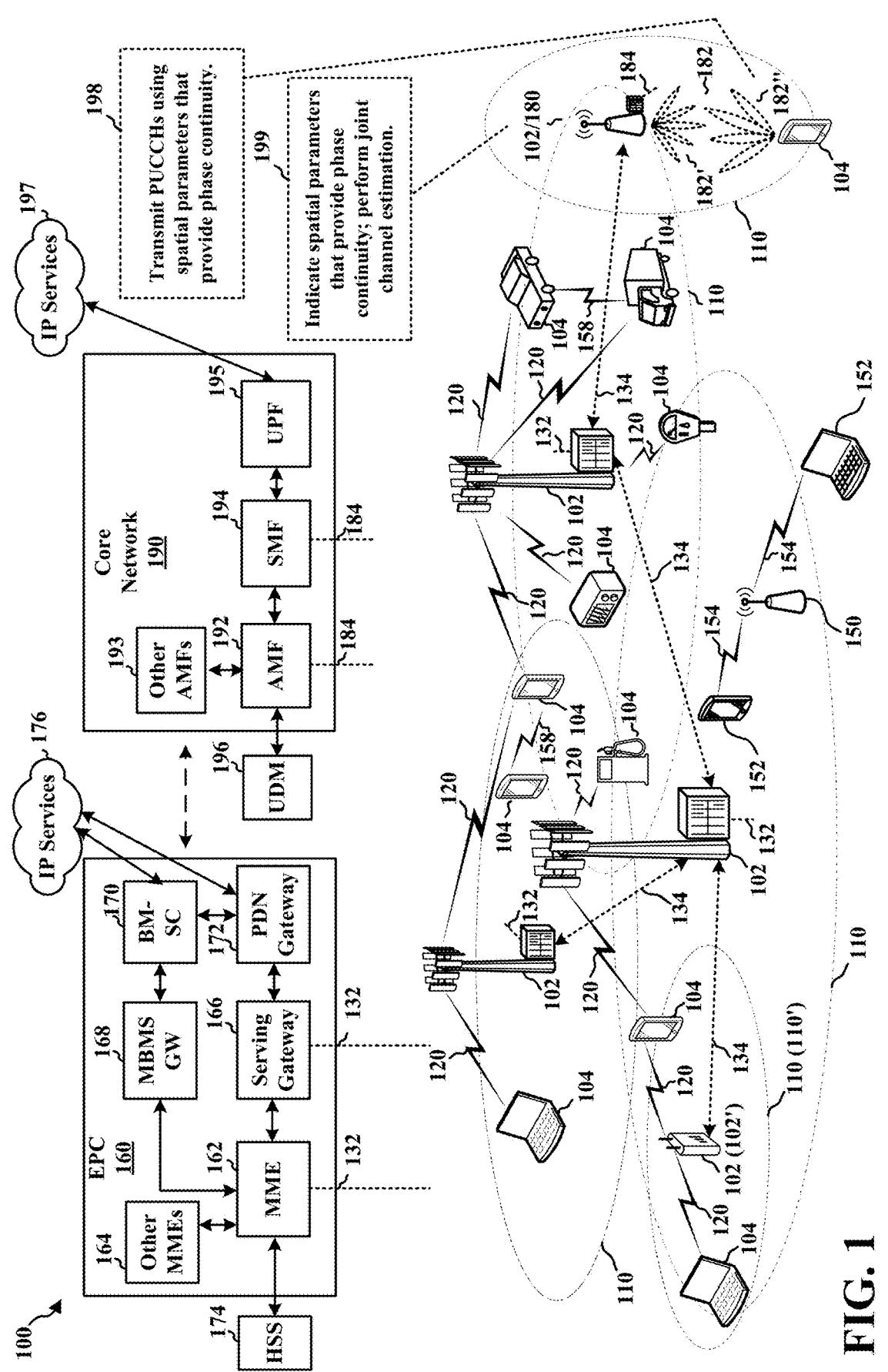
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station.

Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to transmit PUCCHs to the base station 180 using spatial parameters that provide phase continuity for the DMRS of the PUCCHs (198). In certain aspects, the base station 180 may be configured to indicate spatial parameters to the UE 104 that provide phase continuity for the DMRS of the PUCCHs, and to perform joint channel estimation for the PUCCHs (199). Although the following description may be focused on 5G NR, the concepts described herein may be applicable to other similar areas, such as LTE, LTE-A, CDMA, GSM, and other wireless technologies.

Figures 2A, 2B, 2C, 2D:
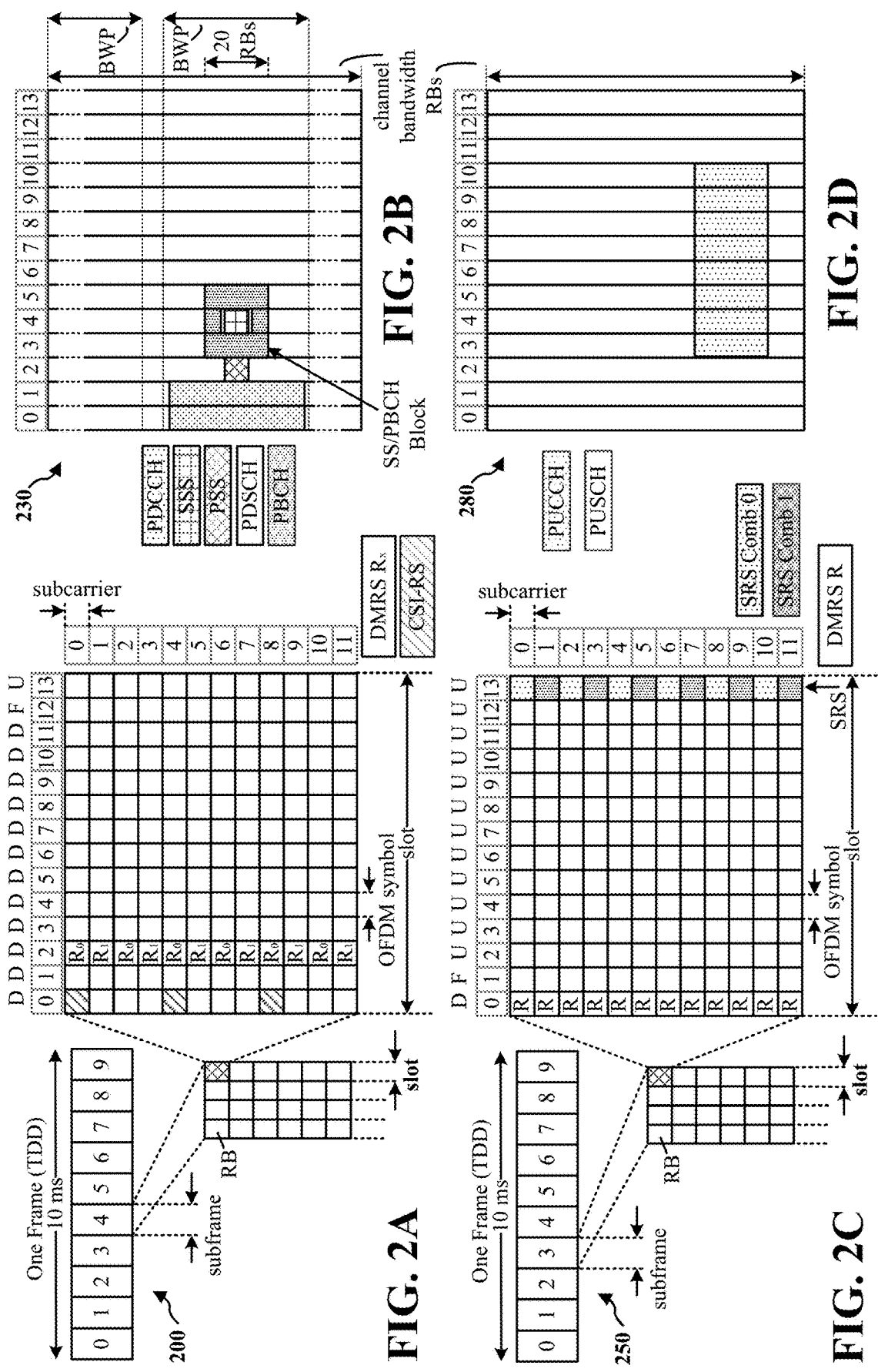
FIGS. 2A, 2B, 2C, and 2D are diagrams illustrating examples of a first 5G NR frame, DL channels within a 5G NR subframe, a second 5G NR frame, and UL channels within a 5G NR subframe, respectively.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of slot configuration 0 with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
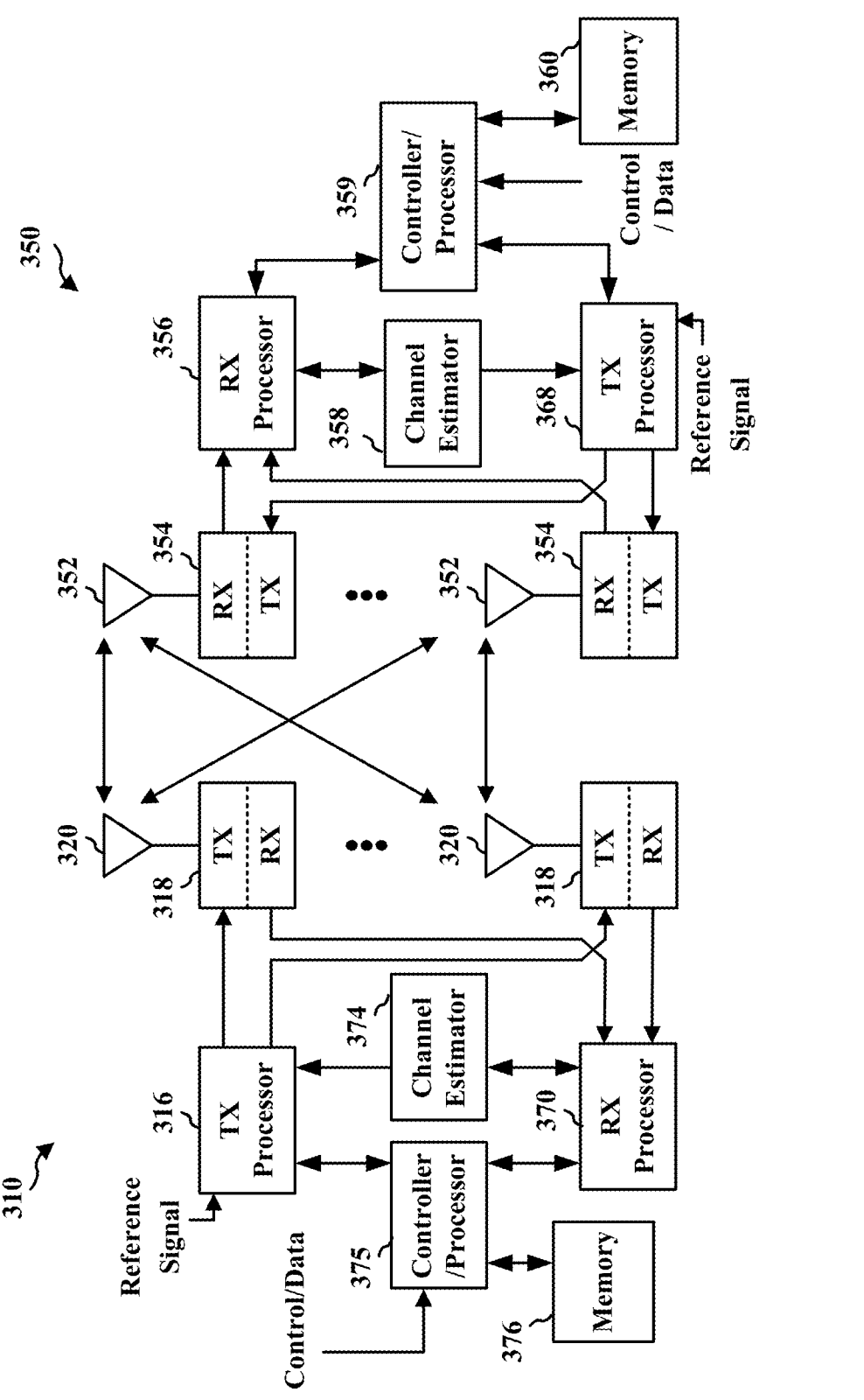
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC)

layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Figure 4:
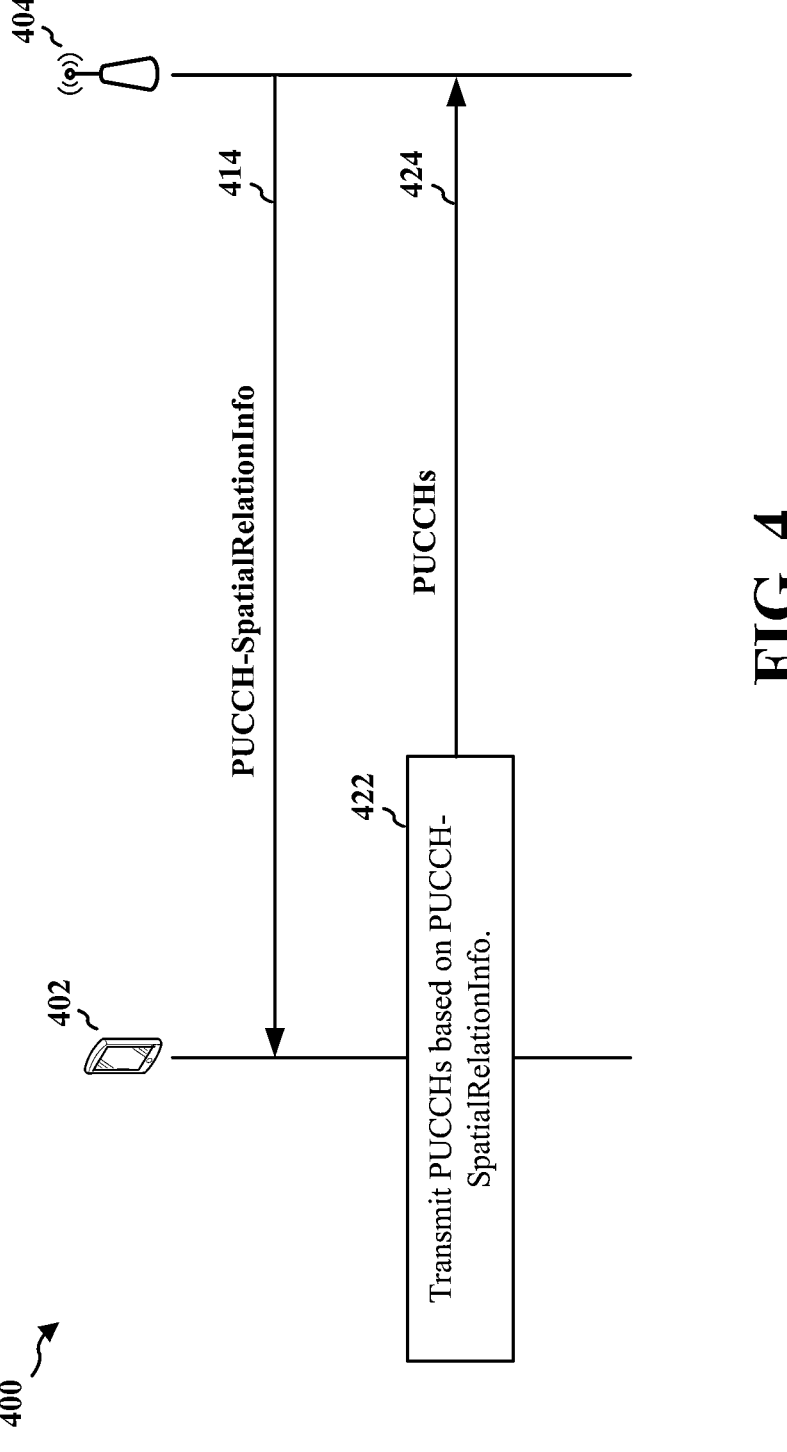
FIG. 4 is a communication flow diagram illustrating uplink spatial filter and power control parameter selection for a PUCCH.

FIG. 4 is a communication flow diagram 400 illustrating uplink spatial filter and power control parameter selection for a PUCCH. A base station 404 may schedule a UE 402 to transmit a PUCCH to the base station 404. The base station 404 may transmit a PUCCH-SpatialRelationInfo information element (IE) 414 corresponding to the PUCCH to the UE 402, and the UE 402 may receive the PUCCH-Spatial-RelationInfo IE 414. For example, the base station 404 may transmit a PDSCH containing the PUCCH-SpatialRelation-Info IE 414 to the UE 402.

The PUCCH-SpatialRelationInfo IE 414 may identify a reference spatial filter. For example, the PUCCH-SpatialRe-lationInfo IE 414 may identify a spatial filter used by the UE 402 to receive a SSB as the reference spatial filter, may identify a spatial filter used by the UE 402 to receive CSI-RS as the reference spatial filter, or may identify a spatial filter used by the UE 402 to transmit an SRS resource as the reference spatial filter. The PUCCH-SpatialRelationInfo IE 414 may identify power control parameters. For example, the PUCCH-SpatialRelationInfo IE 414 may identify an initial power value, a power ramping step size, or a reference signal for estimating path loss.

As illustrated at 422, the UE 402 may transmit the PUCCH 424 to the base station 404. The UE 402 may utilize the reference spatial filter identified in the PUCCH-Spatial-RelationInfo IE 414 as the spatial filter for transmitting the PUCCH. The UE 402 may utilize the power control param-eters identified in the PUCCH-SpatialRelationInfo IE 414 for transmitting the PUCCH.

In some aspects, a UE may maintain phase continuity across a set of PUCCHs so that a base station may perform joint channel estimation based on DMRSs in PUCCHs in the set. For example, the UE and the base station may utilize DMRSs in PUCCHs in the set to allow for joint channel estimation over multiple PUCCHs. In some aspects, some aspects, a PUCCH comprising a corresponding DMRS may comprise a DMRS that is bundled with a PUCCH. In some aspects, a set of PUCCHs, where one or more PUCCHs of the set of PUCCHs or each PUCCH of the set of PUCCHs comprises a corresponding DMRS, may comprise bundled DMRS. In joint channel estimation, a base station may utilize the DMRSs in one or more PUCCHs in a set of PUCCHs to determine a channel estimate for demodulating that set of PUCCHs. The channel estimation for a given PUCCH is based not just on the DMRS contained in that PUCCH, but also on the DMRS of other PUCCH of the set. In some aspects, joint channel estimation may be referred to as cross-slot channel estimation and the base station may determine a channel estimate for multiple slots based on DMRS received in multiple slots. In some aspects, the UE may maintain phase continuity across a set of transmissions by storing the phase at the end of a previous transmission and adjusting the phase at the beginning of a next transmis-sion, if needed, until the phase at the beginning of the next transmission matches the phase at the end of the previous transmission.

When transmitting a set of transmissions, such as PUCCHs, where one or more transmissions of the set of transmission comprise a DMRS, the UE may maintain phase continuity across the set of transmissions (e.g., a set of PUCCHs) and transmit the set of transmissions with phase continuity. For example, the UE may maintain phase con-tinuity across the set of transmissions by ensuring that the phase at the end of one transmission is the phase at the beginning of the next transmission. Phase continuity may refer to the phase of the transmitted waveforms varying consistently and continuously across the transmissions. This may be referred to as the transmissions having phase con-tinuity. The phase at the beginning of one transmission waveform may be assumed as continuing from the phase at the end of the immediately preceding transmission wave-form. Without phase continuity, the base station may not be able to utilize the DMRS in one or more transmissions of the set of transmissions to perform joint channel estimation. If the transmissions containing the DMRS have discontinuity in the phases of their waveforms, joint combination of the DMRS transmissions at the base station may be destructive instead of constructive. Furthermore, DMRS transmissions may have different unknown phase values. Hence, jointly processing DMRS across the multiple transmissions to esti-mate the channel may not be possible.

Phase discontinuity between transmissions may occur where the phase of one transmission does not continue into the next transmission. Phase discontinuity may be caused by changes in the phase of the gain applied to transmission waveforms by the power amplifier. For example, where PUCCH slots are transmitted on non-contiguous time resources, the power amplifier may be turned off between the transmissions; when the power amplifier is turned on for the second transmission, the phase may be random, and may not be continuous from the previous transmission. PUCCH slots transmitted on different frequency resources, with different transmit power, or with different timing advances may also have phase discontinuity. Phase discontinuity may occur where a different antenna port or spatial filter is used for different transmissions. Phase discontinuity may also occur where different power control parameters are applied to a transmission. For example, different initial power val-ues, different power ramping step sizes, or different refer-ence signals for estimating path loss may cause phase discontinuity. When a transmission uses a different antenna port or spatial filter, or different power control parameters, a power amplifier may be driven differently or a different power amplifier may be used.

PUCCHs transmitted based on different PUCCH-Spatial-RelationInfo IEs may be transmitted using different spatial filters or may be transmitted using different power control parameters which may result in phase discontinuity.

Figure 5:
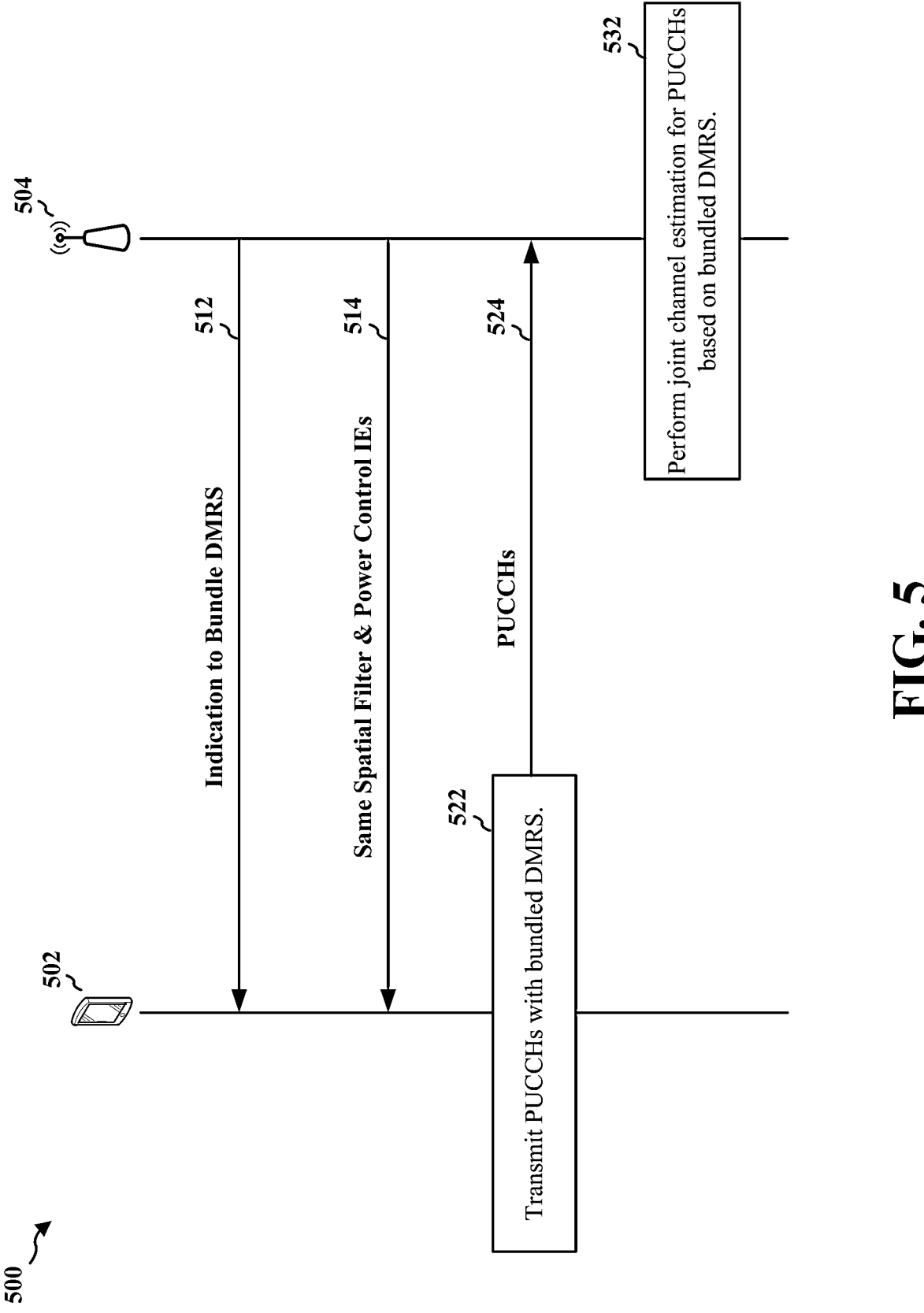
FIG. 5 is a communication flow diagram illustrating use of the same spatial filters and power control parameters to perform joint channel estimation based on DMRSs in PUCCHs in a set of PUCCHs.

FIG. 5 is a communication flow diagram 500 illustrating use of the same spatial filters and power control parameters to perform joint channel estimation based on DMRSs in PUCCHs in a set of PUCCHs. A base station 504 may determine to schedule a set of PUCCHs for uplink from a UE 502, and that the base station 504 will perform joint channel estimation for the set of PUCCHs utilizing the DMRSs in one or more PUCCHs in the set of PUCCHs. The base station 504 may transmit an indication 512 to the UE 502 to maintain phase continuity across a set of PUCCHs, and the UE 502 may receive the indication 512. In some aspects, the indication 512 may be included in an RRC message. In some aspects, the indication 512 may be included in system information (e.g., in a SIB).

In some aspects, the base station 504 may transmit spatial filter and power control IEs 514 for the set of PUCCHs to the UE 502, and the UE 502 may receive the spatial filter and power control IEs 514. The spatial filter and power control IEs 514 may identify spatial parameters (e.g., a spatial filter or a reference spatial filter) and power control parameters for transmission of the corresponding PUCCH. For example, the spatial filter and power control IEs may be PUCCH-SpatialRelationInfo IEs for the PUCCHs. The base station 504 may generate and send the same spatial filter and power control IEs 514 for each PUCCH of the set of PUCCHs based on having determined to perform joint channel estimation for the set of PUCCHs (e.g., the base station 404 may send the same PUCCH-SpatialRelationInfo for each PUCCH).

In some aspects, the base station 504 may transmit a single indicator (e.g., a single spatial filter and power control IE or a single spatial filter IE and a single power control IE) corresponding to all PUCCHs of the set of PUCCHs. The single indicator may identify spatial parameters (e.g., a spatial filter or a reference spatial filter) and power control parameters to be used for transmission of the entire set of PUCCHs.

As illustrated at 522, the UE 502 may transmit the set of PUCCHs 524 where one or more PUCCHs comprise a DMRS. The UE 502 may maintain phase continuity across the set of PUCCHs 524 and transmit the set of PUCCHs with phase continuity. The UE 502 may transmit the set of PUCCHs 524 based on the spatial filter and power control IEs 514 received from the base station 504. The UE 502 may transmit the set of PUCCHs 524 using the same spatial filter and the same power control parameters based on receiving the same spatial filter and power control IEs for the set of PUCCHs 524. The UE 502 may transmit the set of PUCCHs 524 with phase continuity, as the UE 502 uses the same spatial filter and power control parameters.

The base station 504 may receive the set of PUCCHs 524. As illustrated at 532, the base station 504 may perform joint channel estimation for the set of PUCCHs 524 based on DMRSs in PUCCHs in the set of PUCCHs 524. The base station 504 may generate a channel estimate based on the DMRSs in one or more PUCCHs in the set of PUCCHs 524. For example, the base station 504 may generate a channel estimate based on the DMRSs of multiple PUCCHs or all of the PUCCHs in the set of PUCCHs 524. The base station 504 may use the channel estimate to decode the set of PUCCHs 524.

Figure 6:
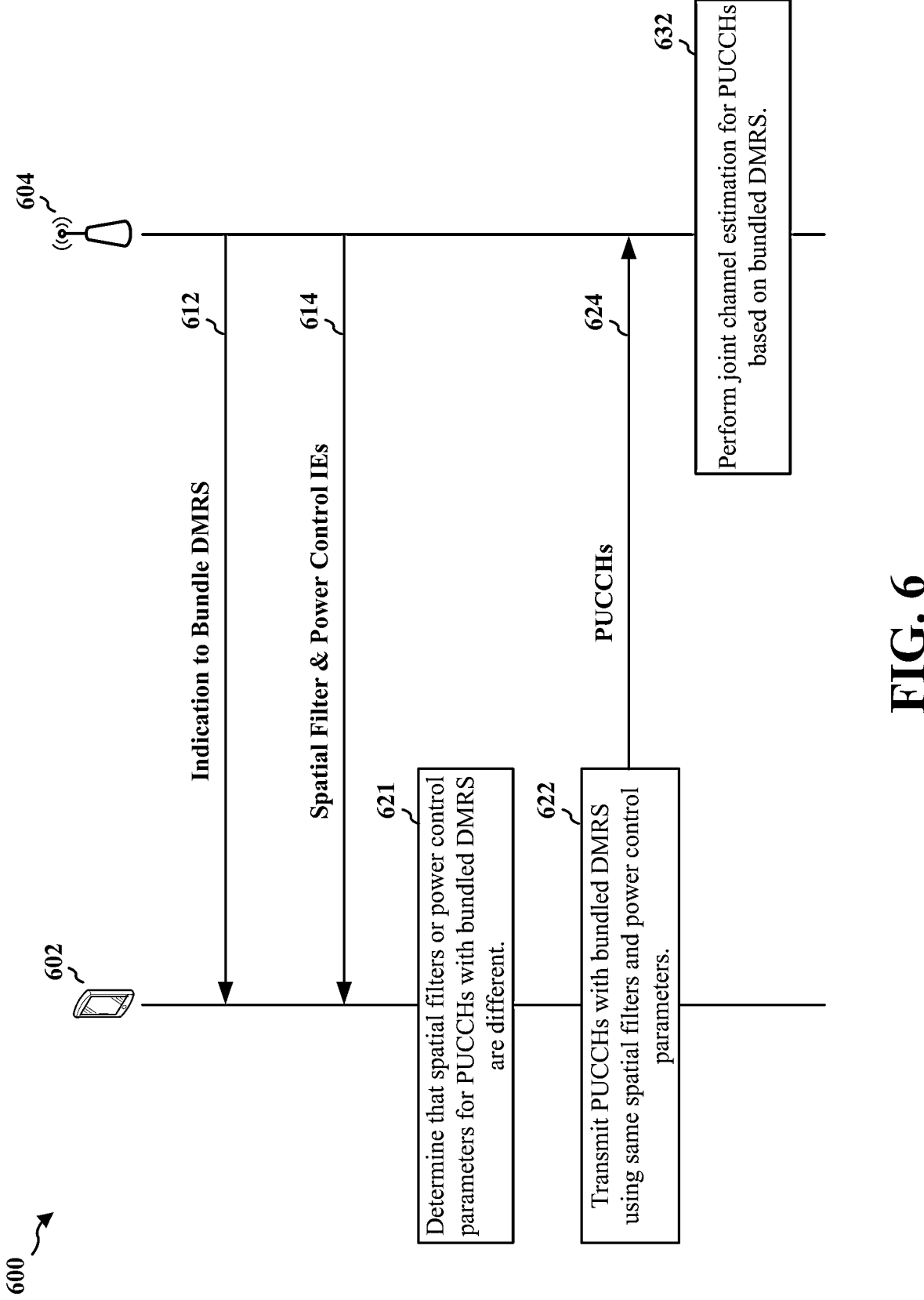
FIG. 6 is a communication flow diagram illustrating use of the same spatial filters and power control parameters to perform joint channel estimation based on DMRSs in PUCCHs in a set of PUCCHs with different spatial filters and power control parameters.

FIG. 6 is a communication flow diagram 600 illustrating use of the same spatial filters and power control parameters to perform joint channel estimation based on DMRSs in PUCCHs in a set of PUCCHs with different spatial filters and power control parameters. A base station 604 may determine to schedule a set of PUCCHs for uplink from a UE 602, and that the base station 604 will perform joint channel estimation for the set of PUCCHs. The base station 604 may transmit an indication 612 to the UE 602 to maintain phase continuity across a set of PUCCHs, and the UE 602 may receive the indication 612. For example, the indication 612 may be the same as described above with respect to the indication 512 of FIG. 5.

The base station 604 may transmit spatial filter and power control IEs 614 for the set of PUCCHs to the UE 602, and the UE 602 may receive the spatial filter and power control IEs 614. In some aspects, the spatial filter and power control IEs 614 may be PUCCH-SpatialRelationInfo IEs for the PUCCHs.

As illustrated at 621, the UE 602 may determine that the spatial filter and power control IEs 614 received for the set of PUCCHs, which the indication 612 indicated should be transmitted, where one or more PUCCHs in the set of PUCCHs comprise a DMRS, are different. For example, the UE 602 may determine that the spatial filter and power control IEs 614 have different values or identify different reference spatial filters or power control parameters.

As illustrated at 622, the UE 602 may transmit the set of PUCCHs 624, where one or more PUCCHs in the set of PUCCHs comprise a DMRS, using the same spatial filter and power control parameters. In some aspects, the UE 602 may determine the most common received reference spatial filter or power control parameter for the set of PUCCHs 624 and may use that reference spatial filter or power control parameter for the spatial filter for all of the PUCCHs of the set of PUCCHs 624. For example, the UE 602 may receive an indication to maintain phase continuity across the set of five PUCCHs from the base station 604. The UE 602 may receive a PUCCH-SpatialRelationInfo identifying the CSI-RS reception spatial filter as the reference spatial filter for the first, second, and fifth PUCCHs and may receive a PUCCH-SpatialRelationInfo identifying the SSB reception spatial filter as the reference spatial filter for the third and fourth PUCCHs. The UE 602 may transmit all five PUCCHs, where each PUCCH may comprise a DMRS and where the set of five PUCCHs have phase continuity, with a spatial filter based on the CSI-RS reception spatial filter. In some aspects, the UE 602 may use the first received reference spatial filter or power control parameter as the reference spatial filter or power control parameter for all of the PUCCHs of the set of PUCCHs 624. For example, the UE 602 may receive an indication to maintain phase continuity across the set of five PUCCHs from the base station 604. The UE 602 may receive a PUCCH-SpatialRelationInfo identifying the CSI-RS reception spatial filter as the reference spatial filter for the first and second PUCCHs and may receive a PUCCH-SpatialRelationInfo identifying the SSB reception spatial filter as the reference spatial filter for the third, fourth, and fifth PUCCHs. The UE 602 may transmit all five PUCCHs with a spatial filter based on the CSI-RS reception spatial filter, where each PUCCH may comprise a DMRS and where the set of five PUCCHs have phase continuity.

The base station 604 may receive the set of PUCCHs 624. As illustrated at 632, the base station 604 may perform joint channel estimation for the set of PUCCHs 624 based on DMRSs in one or more PUCCHs in the set of PUCCHs 624. The base station 604 may generate a channel estimate based on the DMRSs in one or more PUCCHs in the set of PUCCHs 624. For example, the base station 604 may generate a channel estimate based on the DMRSs of multiple PUCCHs or all of the PUCCHs in the set of PUCCHs 624. The base station 604 may use the channel estimate to decode the set of PUCCHs 624.

Figure 7:
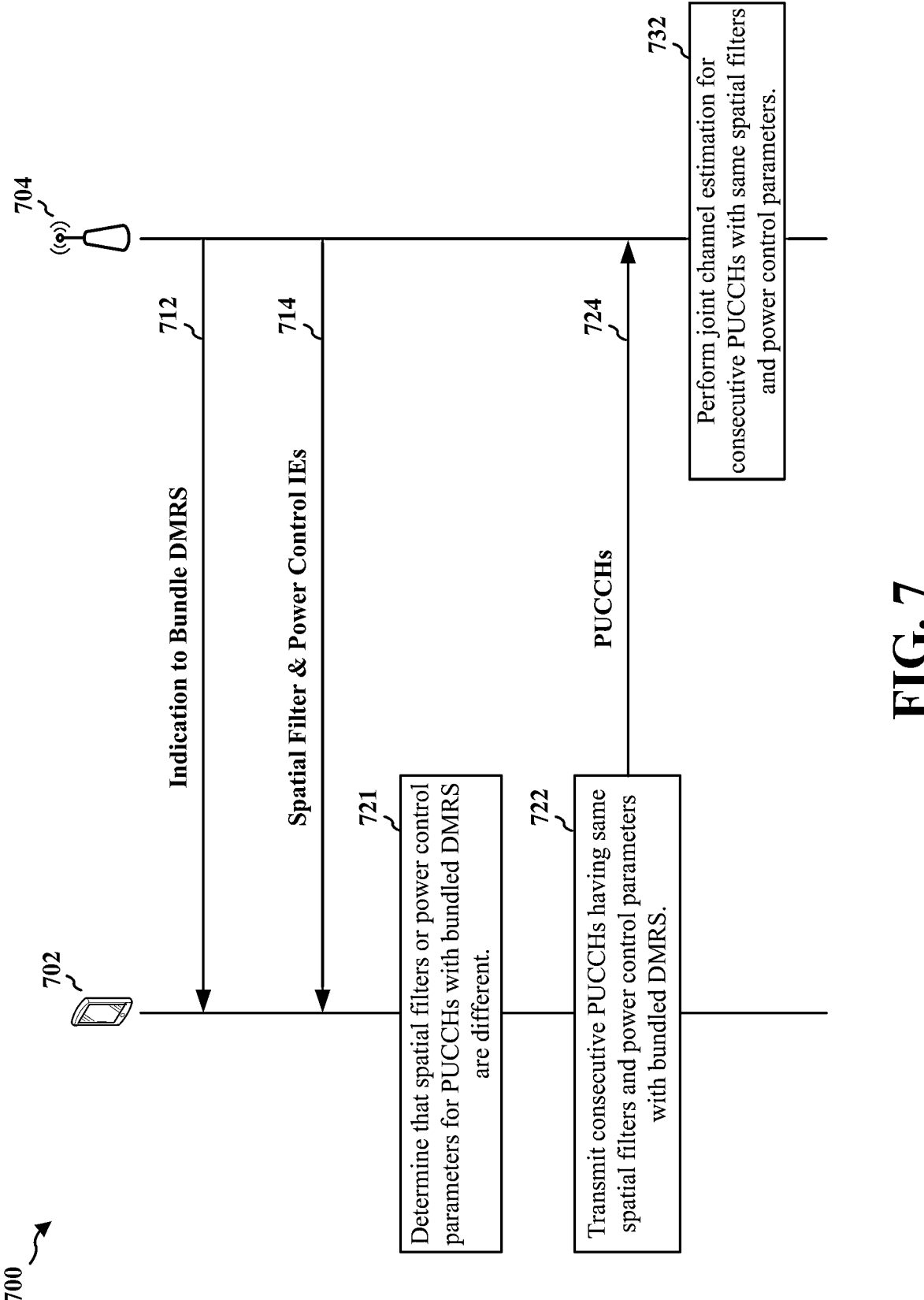
FIG. 7 is a communication flow diagram illustrating transmission of a set of PUCCHs using different spatial filters and power control parameters.
Figure 10:
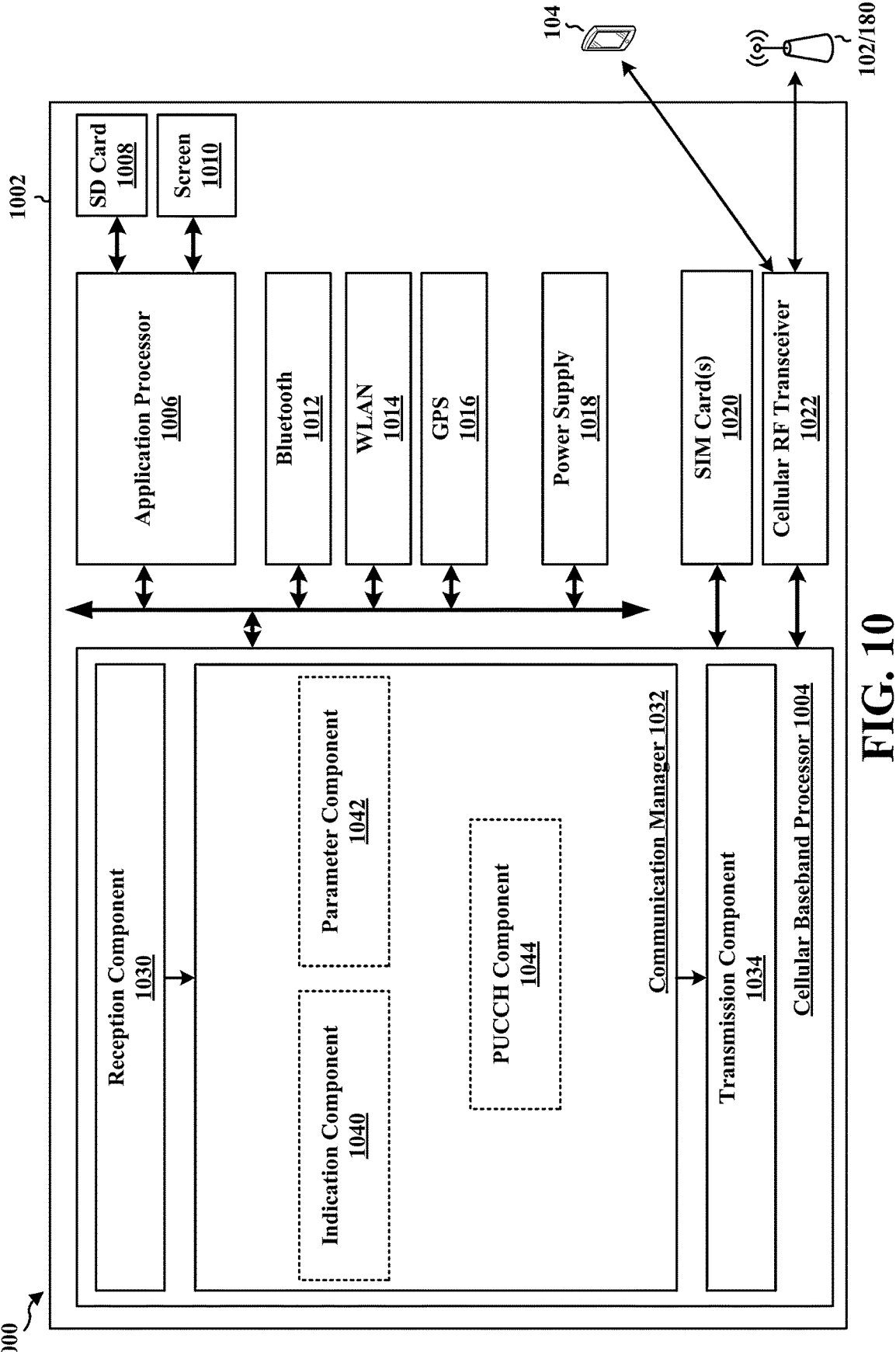
FIG. 10 is a diagram illustrating an example of a hardware implementation for an example apparatus.

FIG. 7 is a communication flow diagram 700 illustrating transmission of a set of PUCCHs using different spatial filters and power control parameters, where one or more PUCCHs in the set of PUCCH comprises a DMRS. A base station 704 may determine to schedule a set of PUCCHs for uplink from a UE 702, and that the base station 704 will perform joint channel estimation for the set of PUCCHs. The base station 704 may transmit an indication 712 to the UE 702 to maintain phase continuity across a set of PUCCHs, and the UE 702 may receive the indication 712. For example, the indication 712 may be the same as described above with respect to the indication 512 of FIG. 5.

The base station 704 may transmit spatial filter and power control IEs 714 for the set of PUCCHs to the UE 702, and the UE 702 may receive the spatial filter and power control IEs 714. In some aspects, the spatial filter and power control IEs 714 may be PUCCH-SpatialRelationInfo IEs for the PUCCHs.

As illustrated at 721, the UE 702 may determine that the spatial filter and power control IEs 714 received for the set of PUCCHs, which the indication 712 indicated should be transmitted with phase continuity, are different. For example, the UE 702 may determine that the spatial filter and power control IEs 714 have different values or identify different reference spatial filters or power control parameters.

As illustrated at 722, the UE 702 may transmit consecutive PUCCHs of the set of PUCCHs that have the same spatial filter and power control parameters identified by their respective spatial filter and power control IEs, where each PUCCH comprises a DMRS. For example, the UE 702 may receive an indication to maintain phase continuity across the set of five PUCCHs from the base station 704. The UE 702 may receive a PUCCH-SpatialRelationInfo identifying the CSI-RS reception spatial filter as the reference spatial filter for the first, second, third, and fifth PUCCHs and may receive a PUCCH-SpatialRelationInfo identifying the SSB reception spatial filter as the reference spatial filter for the fourth PUCCH. The UE 702 may transmit the first, second, and third PUCCHs with a spatial filter based on the CSI-RS reception spatial filter, and may not transmit the fourth and fifth PUCCHs, where the first, second, and third PUCCHs comprise a DMRS and have phase continuity.

The base station 704 may receive the set of PUCCHs 724. As illustrated at 732, the base station 704 may perform joint channel estimation for consecutive PUCCHs of the set of PUCCHs 724 with the same spatial filter and power control parameters based on DMRSs in one or more PUCCHs of those PUCCHs. The base station 704 may use the channel estimate to decode the consecutive PUCCHs with the same spatial filter and power control parameters. The base station 704 may perform a single-PUCCH channel estimation for the other PUCCHs based on the DMRS in those respective PUCCHs. For example, the set of PUCCHs 724 may include five PUCCHs. The first, second, third, and fifth PUCCHs may have a spatial filter based on the CSI-RS reception spatial filter and the fourth PUCCH may have a spatial filter based on the SSB reception spatial filter. The base station 704 may perform joint channel estimation for the first, second, and third PUCCHs. The base station 704 may perform a channel estimate for the fourth PUCCH based on the DMRS of the fourth PUCCH and may perform a channel estimate for the fifth PUCCH based on the DMRS of the fifth PUCCH.

FIG. 8 is a flowchart 800 of a method of wireless communication. The method may be performed by a UE (e.g., the UE 104, 502, 602, 702).

At 802, the UE may receive, from a base station, an indication to transmit a set of physical uplink control channels (PUCCHs), each PUCCH comprising a demodulation reference signal (DMRS). The UE may receive the indication in a radio resource control message or in system information.

At 804, the UE may receive, from the base station, for each PUCCH of the set of PUCCHs, an indicator identifying a spatial relation parameter for the respective PUCCH. The spatial relation parameter for each respective PUCCH may include a reference spatial domain filter. In some aspects, receiving, for each PUCCH of the set of PUCCHs, the indicator identifying the spatial relation parameter for the respective PUSCH may include receiving a single indicator identifying the spatial relation parameter for every PUCCH of the set of PUCCHs. In some aspects, receiving, for each PUCCH of the set of PUCCHs, the indicator identifying the spatial relation parameter for the respective PUSCH may include receiving a separate indicator corresponding to each PUCCH.

At 806, the UE may transmit, to the base station, the set of PUCCHs comprising corresponding DMRS, the set of PUCCHs having phase continuity, each PUCCH of the set of PUCCHs being transmitted based on a same spatial relation parameter, the spatial relation parameter for a first PUCCH of the set of PUCCHs being the same spatial relation parameter.

In some aspects, the indicator for each PUCCH of the set of PUCCHs may indicate the same spatial relation parameter, and each PUCCH of the set of PUCCHs may be transmitted based on its respective spatial relation parameter. Each indicator may further identify a power control parameter for the respective PUCCH, each PUCCH of the set of PUCCHs may be transmitted based on its respective power control parameter, and each indicator may identify a same power control parameter. The power control parameter for each respective PUCCH may include an initial power value, a power ramping step size, or a reference signal to estimate the path loss.

In some aspects, the spatial relation parameter for a second PUCCH of the set of PUCCHs may be different than the same spatial relation parameter, and the second PUCCH may be transmitted based on the same spatial relation parameter. Each indicator may further identify a power control parameter for the respective PUCCH, the power control parameter for the second PUCCH of the set of PUCCHs may be different than the power control parameter for the first PUCCH, and the second PUCCH may be transmitted based on the power control parameter of the first PUCCH. The power control parameter for each respective PUCCH may include an initial power value, a power ramping step size, or a reference signal to estimate the path loss.

FIG. 9 is a flowchart 900 of a method of wireless communication. The method may be performed by a base station (e.g., the base station 102/180, 504, 604, 704).

At 902, the base station may transmit, to a user equipment (UE), an indication to transmit a set of physical uplink control channels (PUCCHs), each PUCCH comprising a demodulation reference signals (DMRS). The base station may transmit the indication in a RRC message or in system information.

At 904, the base station may transmit, to the UE, for each PUCCH of the set of PUCCHs, an indicator identifying a spatial relation parameter for the respective PUCCH. The spatial relation parameter for each respective PUCCH may include a reference spatial domain filter. In some aspects, transmitting, for each PUCCH of the set of PUCCHs, the indicator identifying the spatial relation parameter for the respective PUSCH may include transmitting a single indicator identifying the spatial relation parameter for every PUCCH of the set of PUCCHs. In some aspects, transmitting, for each PUCCH of the set of PUCCHs, the indicator identifying the spatial relation parameter for the respective PUSCH may include transmitting a separate indicator corresponding to each PUCCH.

At 906, the base station may receive, from the UE, the set of PUCCHs, each PUCCH comprising the corresponding DMRS, the set of PUCCHs having phase continuity, each PUCCH of the set of PUCCHs being received based on a same spatial relation parameter, the spatial relation parameter for a first PUCCH of the set of PUCCHs being the same spatial relation parameter.

At 908, the base station may perform joint channel estimation for the set of PUCCHs based on the corresponding DMRSs in the PUCCHs of the set of PUCCHs.

In some aspects, the indicator for each PUCCH of the set of PUCCHs may indicate the same spatial relation parameter, and each PUCCH of the set of PUCCHs may be received based on its respective spatial relation parameter.

Each indicator may further identify a power control parameter for the respective PUCCH, each PUCCH of the set of PUCCHs may be received based on its respective power control parameter, and each indicator may identify a same power control parameter. The power control parameter for each respective PUCCH may include an initial power value, a power ramping step size, or a reference signal to estimate the path loss.

In some aspects, the spatial relation parameter for a second PUCCH of the set of PUCCHs may be different than the same spatial relation parameter, and the second PUCCH may be received based on the same spatial relation parameter. Each indicator may further identify a power control parameter for the respective PUCCH, the power control parameter for the second PUCCH of the set of PUCCHs may be different than the power control parameter for the first PUCCH, and the second PUCCH may be received based on the power control parameter of the first PUCCH. The power control parameter for each respective PUCCH may include an initial power value, a power ramping step size, or a reference signal to estimate the path loss.

10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/ memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/ processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1032 includes an indication component 1040 that is configured to receive an indication to transmit a set of PUCCHs, each PUCCH comprising a DMRS, e.g., as described in connection with 802 of FIG. 8. The communication manager 1032 further includes a parameter component 1042 that is configured to receive, for each PUCCH of the set of PUCCHs, an indicator identifying a spatial relation parameter, e.g., as described in connection with 804 of FIG. 8. The communication manager 1032 further includes a PUCCH component 1044 that is configured to transmit the set of PUCCHs comprising corresponding DMRS, the set of PUCCHs having phase continuity, each PUCCH of the set of PUCCHs being transmitted based on a same spatial relation parameter, the spatial relation parameter for a first PUCCH of the set of PUCCHs being the same spatial relation parameter, e.g., as described in connection with 806 of FIG. 8.

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for receiving, from a base station, an indication to transmit a set of physical uplink control channels (PUCCHs), each PUCCH comprising a demodulation reference signals (DMRS), means for receiving, from the base station, for each PUCCH of the set of PUCCHs, an indicator identifying a spatial relation parameter for the respective PUCCH, and means for transmitting, to the base station, the set of PUCCHs comprising corresponding DMRS, the set of PUCCHs having phase continuity, each PUCCH of the set of PUCCHs being transmitted based on a same spatial relation parameter, the spatial relation parameter for a first PUCCH of the set of PUCCHs being the same spatial relation parameter. The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
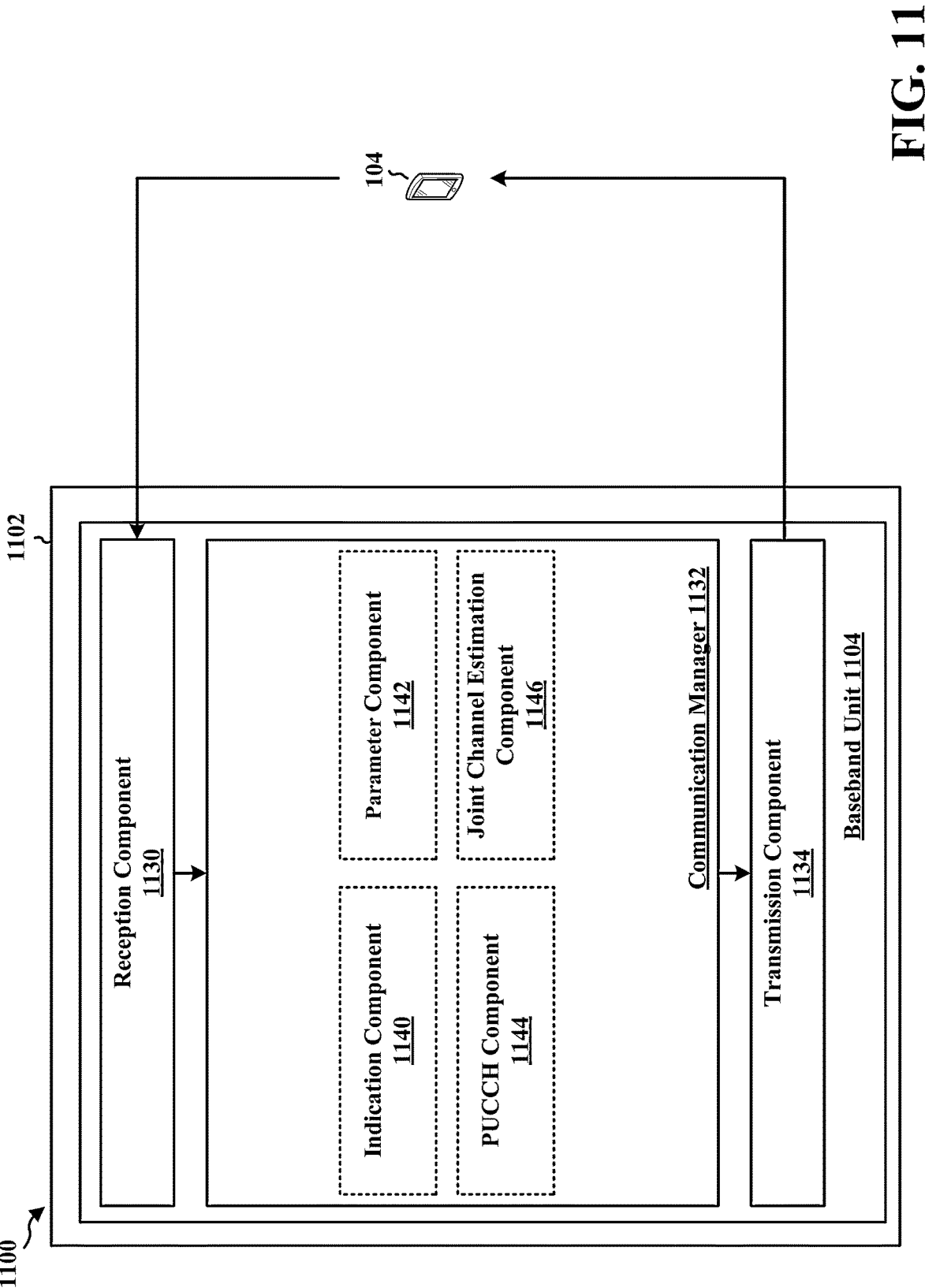
FIG. 11 is a diagram illustrating an example of a hardware implementation for an example apparatus.

FIG. 11 is a diagram 1100 illustrating an example of a hardware implementation for an apparatus 1102. The apparatus 1102 is a BS and includes a baseband unit 1104. The baseband unit 1104 may communicate through a cellular RF transceiver with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 310 and may include the memory 376 and/or at least one of the TX processor 316, the RX processor 370, and the controller/processor 375.

The communication manager 1132 includes an indication component 1140 that transmits, to a UE, an indication to transmit a set of PUCCHs, each PUCCH comprising a corresponding DMRS, e.g., as described in connection with 902 of FIG. 9. The communication manager 1132 further includes a parameter component 1142 that transmits, to the UE, for each PUCCH of the set of PUCCHs, an indicator identifying a spatial relation parameter, e.g., as described in connection with 904. The communication manager 1132 further includes a PUCCH component 1144 that receives, from the UE, the set of PUCCHs DMRS, each PUCCH comprising the corresponding DMRS, the set of PUCCHs having phase continuity, each PUCCH of the set of PUCCHs being transmitted based on a same spatial relation parameter, the spatial relation parameter for a first PUCCH of the set of PUCCHs being the same spatial relation parameter, e.g., as described in connection with 906 of FIG. 9. The communication manager 1132 further includes a joint channel estimation component 1146 that performs joint channel estimation for the set of PUCCHs based on corresponding DMRSs in the PUCCHs of the set of PUCCHs.

The apparatus may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for transmitting, to a user equipment (UE), an indication to transmit a set of physical uplink control channels (PUCCHs), each PUCCH comprising a corresponding demodulation reference signals (DMRS), means for transmitting, to the UE, for each PUCCH of the set of PUCCHs, an indicator identifying a spatial relation parameter for the respective PUCCH, means for receiving, from the UE, the set of PUCCHs, each PUCCH comprising the corresponding DMRS, the set of PUCCHs having phase continuity, each PUCCH of the set of PUCCHs being received based on a same spatial relation parameter, the spatial relation parameter for a same PUCCH of the set of PUCCHs being the same spatial relation parameter. The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a user equipment (UE), comprising: receiving, from a base station, an indication to transmit a set of physical uplink control channels (PUCCHs), one or more PUCCHs in the set of PUCCHs comprising a demodulation reference signal (DMRS); receiving, from the base station, for each PUCCH of the set of PUCCHs, an indicator identifying a spatial relation parameter for the respective PUCCH; and transmitting, to the base station, the set of PUCCHs comprising corresponding DMRS, the set of PUCCHs having phase continuity, each PUCCH of the set of PUCCHs being transmitted based on a same spatial relation parameter, the spatial relation parameter for a first PUCCH of the set of PUCCHs being the same spatial relation parameter.

Example 2 is the method of Example 1, wherein the spatial relation parameter for each respective PUCCH comprises a reference spatial domain filter.

Example 3 is the method of any of Examples 1 and 2, wherein the indicator for each PUCCH of the set of PUCCHs indicates the same spatial relation parameter, and wherein each PUCCH of the set of PUCCHs is transmitted based on its respective spatial relation parameter.

Example 4 is the method of any of Examples 1 to 3, wherein each indicator further identifies a power control parameter for the respective PUCCH, wherein each PUCCH of the set of PUCCHs is transmitted based on its respective power control parameter, and wherein each indicator identifies a same power control parameter.

Example 5 is the method of any of Examples 1 to 4, wherein the power control parameter for each respective PUCCH comprises an initial power value, a power ramping step size, or a reference signal to estimate a path loss.

Example 6 is the method of any of Examples 1 to 5, wherein the spatial relation parameter for a second PUCCH of the set of PUCCHs is different than the same spatial relation parameter, and wherein the second PUCCH is transmitted based on the same spatial relation parameter.

Example 7 is the method of any of Examples 1 to 6, wherein each indicator further identifies a power control parameter for the respective PUCCH, wherein the power control parameter for the second PUCCH of the set of PUCCHs is different than the power control parameter for the first PUCCH, and wherein the second PUCCH is transmitted based on the power control parameter of the first PUCCH.

Example 8 is the method of any of Examples 1 to 7, wherein the power control parameter for each respective PUCCH comprises an initial power value, a power ramping step size, or a reference signal to estimate a path loss.

Example 9 is the method of any of Examples 1 to 8, wherein the UE receives the indication in a radio resource control message or in system information.

Example 10 is a method of wireless communication at a base station, comprising: transmitting, to a user equipment (UE), an indication to transmit a set of physical uplink control channels (PUCCHs), one or more PUCCHs in the set of PUCCHs comprising a demodulation reference signal (DMRS); transmitting, to the UE, for each PUCCH of the set of PUCCHs, an indicator identifying a spatial relation parameter for the respective PUCCH; and receiving, from the UE, the set of PUCCHs, one or more PUCCHs in the set of PUCCHs comprising DMRS, the set of PUCCHs having phase continuity, each PUCCH of the set of PUCCHs being received based on a same spatial relation parameter, the spatial relation parameter for a first PUCCH of the set of PUCCHs being the same spatial relation parameter.

Example 11 is the method of Example 10, further comprising performing joint channel estimation for the set of PUCCHs based on the corresponding DMRS in the PUCCHs in the set of PUCCHs.

Example 12 is the method of any of Examples 10 and 11, wherein the spatial relation parameter for each respective PUCCH comprises a reference spatial domain filter.

Example 13 is the method of any of Examples 10 to 12, wherein the indicator for each PUCCH of the set of PUCCHs indicates the same spatial relation parameter, and wherein each PUCCH of the set of PUCCHs is received based on its respective spatial relation parameter.

Example 14 is the method of any of Examples 10 to 13, wherein each indicator further identifies a power control parameter for the respective PUCCH, wherein each PUCCH of the set of PUCCHs is received based on its respective power control parameter, and wherein each indicator identifies a same power control parameter.

Example 15 is the method of any of Examples 10 to 14, wherein the power control parameter for each respective PUCCH comprises an initial power value, a power ramping step size, or a reference signal to estimate a path loss.

Example 16 is the method of any of Examples 10 to 15, wherein the spatial relation parameter for a second PUCCH of the set of PUCCHs is different than the same spatial relation parameter, and wherein the second PUCCH is received based on the same spatial relation parameter.

Example 17 is the method of any of Examples 10 to 16, wherein each indicator further identifies a power control parameter for the respective PUCCH, wherein the power control parameter for the second PUCCH of the set of PUCCHs is different than the power control parameter for the first PUCCH, and wherein the second PUCCH is received based on the power control parameter of the first PUCCH.

Example 18 is the method of any of Examples 10 to 17, wherein the power control parameter for each respective PUCCH comprises an initial power value, a power ramping step size, or a reference signal to estimate a path loss.

Example 19 is the method of any of Examples 10 to 18, wherein the base station transmits the indication in a radio resource control message or in system information.

Example 20 is an apparatus for wireless communication at a user equipment (UE), comprising: means for receiving, from a base station, an indication to transmit a set of physical uplink control channels (PUCCHs), one or more PUCCHs in the set of PUCCHs comprising a demodulation reference signal (DMRS); means for receiving, from the base station, for each PUCCH of the set of PUCCHs, an indicator identifying a spatial relation parameter for the respective PUCCH; and means for transmitting, to the base station, the set of PUCCHs comprising corresponding DMRS, the set of PUCCHs having phase continuity, each PUCCH of the set of PUCCHs being transmitted based on a same spatial relation parameter, the spatial relation parameter for a first PUCCH of the set of PUCCHs being the same spatial relation parameter.

Example 21 is an apparatus for wireless communication at a user equipment (UE), comprising: a memory; and at least one processor coupled to the memory and configured to: receive, from a base station, an indication to transmit a set of physical uplink control channels (PUCCHs), one or more PUCCHs in the set of PUCCHs comprising a demodulation reference signal (DMRS); receive, from the base station, for each PUCCH of the set of PUCCHs, an indicator identifying a spatial relation parameter for the respective PUCCH; and transmit, to the base station, the set of PUCCHs comprising corresponding DMRS, the set of PUCCHs having phase continuity, each PUCCH of the set of PUCCHs being transmitted based on a same spatial relation parameter, the spatial relation parameter for a first PUCCH of the set of PUCCHs being the same spatial relation parameter.

Example 22 is the apparatus of Example 21, wherein the spatial relation parameter for each respective PUCCH comprises a reference spatial domain filter.

Example 23 is the apparatus of any of Examples 21 and 22, wherein the indicator for each PUCCH of the set of PUCCHs indicates the same spatial relation parameter, and wherein each PUCCH of the set of PUCCHs is transmitted based on its respective spatial relation parameter.

Example 24 is the apparatus of any of Examples 21 to 23, wherein each indicator further identifies a power control parameter for the respective PUCCH, wherein each PUCCH of the set of PUCCHs is transmitted based on its respective power control parameter, and wherein each indicator identifies a same power control parameter.

Example 25 is the apparatus of any of Examples 21 to 24, wherein the power control parameter for each respective PUCCH comprises an initial power value, a power ramping step size, or a reference signal to estimate a path loss.

Example 26 is the apparatus of any of Examples 21 to 25, wherein the spatial relation parameter for a second PUCCH of the set of PUCCHs is different than the same spatial relation parameter, and wherein the second PUCCH is transmitted based on the same spatial relation parameter.

Example 27 is the apparatus of any of Examples 21 to 26, wherein each indicator further identifies a power control parameter for the respective PUCCH, wherein the power control parameter for the second PUCCH of the set of PUCCHs is different than the power control parameter for the first PUCCH, and wherein the second PUCCH is transmitted based on the power control parameter of the first PUCCH.

Example 28 is the apparatus of any of Examples 21 to 27, wherein the power control parameter for each respective PUCCH comprises an initial power value, a power ramping step size, or a reference signal to estimate a path loss.

Example 29 is the apparatus of any of Examples 21 to 28, wherein the at least one processor receives the indication in a radio resource control message or in system information.

Example 30 is a non-transitory computer-readable medium storing computer executable code for wireless communication at a user equipment (UE) the code when executed by a processor cause the processor to perform the method of any of claims 1-9.

Example 31 is an apparatus for wireless communication at a base station, comprising: means for transmitting, to a user equipment (UE), an indication to transmit a set of physical uplink control channels (PUCCHs), one or more PUCCHs in the set of PUCCHs comprising a demodulation reference signal (DMRS); means for transmitting, to the UE, for each PUCCH of the set of PUCCHs, an indicator identifying a spatial relation parameter for the respective PUCCH; and means for receiving, from the UE, the set of PUCCHs, one or more PUCCHs in the set of PUCCHs comprising DMRS, the set of PUCCHs having phase continuity, each PUCCH of the set of PUCCHs being received based on a same spatial relation parameter, the spatial relation parameter for a first PUCCH of the set of PUCCHs being the same spatial relation parameter Example 32 is an apparatus for wireless communication at a base station, comprising: a memory; and at least one processor coupled to the memory and configured to: transmit, to a user equipment (UE), an indication to transmit a set of physical uplink control channels (PUCCHs), one or more PUCCHs in the set of PUCCHs comprising a demodulation reference signal (DMRS); transmit, to the UE, for each PUCCH of the set of PUCCHs, an indicator identifying a spatial relation parameter for the respective PUCCH; and receive, from the UE, the set of PUCCHs, one or more PUCCHs in the set of PUCCHs comprising DMRS, the set of PUCCHs having phase continuity, each PUCCH of the set of PUCCHs being received based on a same spatial relation parameter, the spatial relation parameter for a first PUCCH of the set of PUCCHs being the same spatial relation parameter.

Example 33 is the apparatus of Example 32, wherein the at least one processor is further configured to perform joint channel estimation for the set of PUCCHs based on the corresponding DMRS in the PUCCHs in the set of PUCCHs.

Example 34 is the example of any of Examples 32 and 33, wherein the spatial relation parameter for each respective PUCCH comprises a reference spatial domain filter.

Example 35 is the example of any of Examples 32 to 34, wherein the indicator for each PUCCH of the set of PUCCHs indicates the same spatial relation parameter, and wherein each PUCCH of the set of PUCCHs is received based on its respective spatial relation parameter.

Example 36 is the example of any of Examples 32 to 35, wherein each indicator further identifies a power control parameter for the respective PUCCH, wherein each PUCCH of the set of PUCCHs is received based on its respective power control parameter, and wherein each indicator identifies a same power control parameter.

Example 37 is the example of any of Examples 32 to 36, wherein the power control parameter for each respective PUCCH comprises an initial power value, a power ramping step size, or a reference signal to estimate a path loss.

Example 38 is the example of any of Examples 32 to 37, wherein the spatial relation parameter for a second PUCCH of the set of PUCCHs is different than the same spatial relation parameter, and wherein the second PUCCH is received based on the same spatial relation parameter.

Example 39 is the example of any of Examples 32 to 38, wherein each indicator further identifies a power control parameter for the respective PUCCH, wherein the power control parameter for the second PUCCH of the set of PUCCHs is different than the power control parameter for the first PUCCH, and wherein the second PUCCH is received based on the power control parameter of the first PUCCH.

Example 40 is the example of any of Examples 32 to 39, wherein the power control parameter for each respective PUCCH comprises an initial power value, a power ramping step size, or a reference signal to estimate a path loss.

Example 41 is the example of any of Examples 32 to 40, wherein the at least one processor transmits the indication in a radio resource control message or in system information.

Example 42 is a non-transitory computer-readable medium storing computer executable code for wireless communication at a base station, the code when executed by a processor cause the processor to perform the method of any of claims 4-6.

What is claimed is:

1. A method of wireless communication at a user equipment (UE), comprising:

receiving, from a base station, an indication to transmit a set of physical uplink control channels (PUCCHs), each PUCCH of the set of PUCCHs comprising a corresponding demodulation reference signal (DMRS);

receiving, from the base station, for each PUCCH of the set of PUCCHs, one or more indicators indicating a respective power control parameters for the set of PUCCHs, wherein each PUCCH of the set of PUCCHs is transmitted based on a corresponding one of the respective power control parameters; and based on different power control parameters being applied to transmissions, transmitting, to the base station, a first PUCCH and a second PUCCH from the set of PUCCHs comprising corresponding DMRSs having phase discontinuity, such that the first PUCCH of the set of PUCCHs is transmitted based on a first power control parameter and the second PUCCH of the set of PUCCHs is transmitted based on a second power control parameter different from the first power control parameter, wherein the first PUCCH and the second PUCCH are consecutive PUCCH transmissions, and wherein the one or more indicators further indicates respective spatial relation parameters for the set of PUCCHs, and wherein the set of PUCCHs are transmitted with the phase discontinuity based on different spatial relation parameters being applied to the transmissions.

2. The method of claim 1, wherein each of the respective power control parameters for the set of PUCCHs comprises an initial power value, a power ramping step size, or a reference signal to estimate a path loss.

3. The method of claim 1, wherein receiving, the one or more indicators indicating the respective spatial relation parameters for the set of PUCCHs comprises a separate indicator corresponding to each PUCCH of the set of PUCCHs.

4. A method of wireless communication at a base station, comprising:

transmitting, to a user equipment (UE), an indication to transmit a set of physical uplink control channels (PUCCHs), each PUCCH of the set of PUCCHs comprising a corresponding demodulation reference signal (DMRS);

transmitting, to the UE, for each PUCCH of the set of PUCCHs, one or more indicators indicating respective power control parameters for the set of PUCCHs, wherein each PUCCH of the set of PUCCHs is transmitted based on a corresponding one of the respective power control parameters; and based on different power control parameters being applied to transmissions, receiving, from the UE, a first PUCCH and a second PUCCH from the set of PUCCHs comprising corresponding DMRSs having phase discontinuity, such that the first PUCCH of the set of PUCCHs is received based on a first power control parameter and the second PUCCH of the set of PUCCHs is received based on a second power control parameter different from the first power control parameter, wherein the first PUCCH and the second PUCCH are consecutive PUCCH transmissions, and wherein the one or more indicators further indicates respective spatial relation parameters for the set of PUCCHs, and wherein the set of PUCCHs are received with the phase discontinuity based on different spatial relation parameters being applied to the transmissions.

5. The method of claim 4, wherein each of the respective power control parameters for the set of PUCCHs comprises an initial power value, a power ramping step size, or a reference signal to estimate a path loss.

6. The method of claim 4, wherein the one or more indicators indicating the respective spatial relation parameters for the set of PUCCHs comprises a separate indicator corresponding to each PUCCH of the set of PUCCHs.

7. An apparatus for wireless communication at a user equipment (UE), comprising:

a memory; and at least one processor coupled to the memory and configured to:

receive, from a base station, an indication to transmit a set of physical uplink control channels (PUCCHs), each PUCCH of the set of PUCCHs comprising a corresponding demodulation reference signal (DMRS);

receive, from the base station, for each PUCCH of the set of PUCCHs, one or more indicators indicating respective power control parameters for the set of PUCCHs, wherein each PUCCH of the set of PUCCHs is transmitted based on a corresponding one of the respective power control parameters; and based on different power control parameters being applied to transmissions, transmit, to the base station, a first PUCCH and a second PUCCH from the set of PUCCHs comprising corresponding DMRSs having phase discontinuity, such that the first PUCCH of the set of PUCCHs is transmitted based on a first power control parameter and the second PUCCH of the set of PUCCHs is transmitted based on a second power control parameter different from the first power control parameter, wherein the first PUCCH and the second PUCCH are consecutive PUCCH transmissions, and wherein the one or more indicators further indicates respective spatial relation parameters for the set of PUCCHs, and wherein the set of PUCCHs are transmitted with the phase discontinuity based on different spatial relation parameters being applied to the transmissions.

8. The apparatus of claim 7, wherein each of the respective power control parameters for the set of PUCCHs comprises an initial power value, a power ramping step size, or a reference signal to estimate a path loss.

9. An apparatus for wireless communication at a base station, comprising:

a memory; and at least one processor coupled to the memory and configured to:

transmit, to a user equipment (UE), an indication to transmit a set of physical uplink control channels (PUCCHs), each PUCCH of the set of PUCCHs comprising a corresponding demodulation reference signal (DMRS);

transmit, to the UE, for each PUCCH of the set of PUCCHs, one or more indicators indicating respective power control parameters for the set of PUCCHs, wherein each PUCCH of the set of PUCCHs is transmitted based on a corresponding one of the respective power control parameters; and based on different power control parameters being applied to transmissions, receive, from the UE, a first PUCCH and a second PUCCH from the set of PUCCHs comprising corresponding DMRS having phase discontinuity, such that the first PUCCH of the set of PUCCHs is received based on a first power control parameter and the second PUCCH of the set of PUCCHs is received based on a second power control parameter different from the first power control parameter, wherein the first PUCCH and the second PUCCH are consecutive PUCCH transmissions, and wherein the one or more indicators further indicates respective spatial relation parameters for the set of PUCCHs, and wherein the set of PUCCHs are received with the phase discontinuity based on different spatial relation parameters being applied to the transmissions.

10. The apparatus of claim 9, wherein wherein each of the respective power control parameters for the set of PUCCHs comprises an initial power value, a power ramping step size, or a reference signal to estimate a path loss.

* * * * *